(12) United States Patent
Sasagawa et al.

(10) Patent No.: US 8,934,019 B2
(45) Date of Patent: Jan. 13, 2015

(54) OMNIDIRECTIONAL CAMERA

(75) Inventors: Jun Sasagawa, Tokyo-to (JP); Hirokazu Yamada, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 390 days.

(21) Appl. No.: 13/426,661

(22) Filed: Mar. 22, 2012

(65) Prior Publication Data

US 2012/0242837 A1     Sep. 27, 2012

(30) Foreign Application Priority Data

Mar. 24, 2011   (JP) .................................. 2011-066186
Mar. 24, 2011   (JP) .................................. 2011-066187
Apr. 4, 2011    (JP) .................................. 2011-082755

(51) Int. Cl.
*H04N 7/18*   (2006.01)
*H04N 5/247*  (2006.01)
*G03B 11/04*  (2006.01)
*H04N 5/232*  (2006.01)

(52) U.S. Cl.
CPC ............. *H04N 5/247* (2013.01); *G03B 11/04* (2013.01); *H04N 7/181* (2013.01); *H04N 5/23238* (2013.01)
USPC ........... 348/159; 348/158; 348/160; 348/161

(58) Field of Classification Search
CPC .... G02B 13/001; G02B 13/06; G02B 3/0025; H01L 27/14603; H01L 27/14627; H01L 27/14636; H01L 27/307; H04N 5/3415; H04N 5/247; H04N 7/181; H04N 5/232; G08B 13/19645; G08B 13/19693
USPC ......................................................... 348/159
See application file for complete search history.

(56) References Cited

U.S. PATENT DOCUMENTS

| | | | | |
|---|---|---|---|---|
| 4,320,949 A | * | 3/1982 | Pagano .......................... | 396/427 |
| 4,769,711 A | * | 9/1988 | Date .............................. | 348/374 |
| 5,041,719 A | * | 8/1991 | Harris et al. .................. | 219/390 |
| 5,130,794 A | | 7/1992 | Ritchey | |
| 6,141,034 A | | 10/2000 | McCutchen | |

(Continued)

FOREIGN PATENT DOCUMENTS

| | | |
|---|---|---|
| DE | 60105068 T2 | 12/2004 |
| EP | 1368703 B1 | 8/2004 |

(Continued)

OTHER PUBLICATIONS

Gaspar et al, Vision-based Navigation and Environmental Representations with an Omni-directional Camera, Dec. 2000.*

(Continued)

*Primary Examiner* — Andy Rao
*Assistant Examiner* — Shan Elahi
(74) *Attorney, Agent, or Firm* — Nields, Lemack & Frame, LLC

(57) ABSTRACT

An omnidirectional camera comprises two or more camera units, a camera assembly in which the two or more camera units are mounted, a heat shield cover to accommodate the camera assembly, a heat insulating member interposed between the camera assembly and the heat shield cover, a space formed between the camera assembly and the heat shield cover, a required number of slits formed in the heat shield cover and extending in up-and-down direction, and in the omnidirectional camera, the space communicates with an outside through the slit.

3 Claims, 5 Drawing Sheets

(56) References Cited

U.S. PATENT DOCUMENTS

| | | | |
|---|---|---|---|
| 6,201,574 B1* | 3/2001 | Martin | 348/315 |
| 6,354,749 B1* | 3/2002 | Pfaffenberger, II | 396/427 |
| 7,043,280 B1* | 5/2006 | Shields et al. | 455/575.1 |
| 7,366,553 B1* | 4/2008 | Shields et al. | 455/575.1 |
| 7,391,298 B1* | 6/2008 | Campbell et al. | 340/286.02 |
| 7,552,025 B2 | 6/2009 | Ohtomo et al. | |
| 7,627,235 B2* | 12/2009 | McCutchen et al. | 396/25 |
| 7,773,121 B1 | 8/2010 | Huntsberger et al. | |
| 8,228,364 B2* | 7/2012 | Cilia | 348/39 |
| 2004/0048507 A1* | 3/2004 | Hage | 439/332 |
| 2004/0151492 A1 | 8/2004 | Blok et al. | |
| 2005/0030392 A1* | 2/2005 | Lee et al. | 348/241 |
| 2006/0075450 A1* | 4/2006 | Haas et al. | 725/121 |
| 2006/0125921 A1 | 6/2006 | Foote | |
| 2006/0132602 A1* | 6/2006 | Muto et al. | 348/148 |
| 2007/0181555 A1* | 8/2007 | Clough et al. | 219/216 |
| 2007/0217782 A1* | 9/2007 | McCutchen et al. | 396/427 |
| 2008/0055409 A1 | 3/2008 | Mars et al. | |
| 2009/0082629 A1* | 3/2009 | Dotan et al. | 600/160 |
| 2009/0112389 A1* | 4/2009 | Yamamoto et al. | 701/29 |
| 2009/0251530 A1* | 10/2009 | Cilia | 348/39 |
| 2009/0323121 A1* | 12/2009 | Valkenburg et al. | 358/1.18 |
| 2010/0201203 A1* | 8/2010 | Schatz et al. | 307/104 |
| 2010/0270014 A1* | 10/2010 | Huang | 165/183 |
| 2011/0069148 A1 | 3/2011 | Jones et al. | |
| 2012/0057852 A1* | 3/2012 | Devleeschouwer et al. | 386/278 |
| 2012/0169842 A1 | 7/2012 | Chuang et al. | |
| 2012/0206565 A1 | 8/2012 | Villmer | |
| 2012/0242785 A1 | 9/2012 | Sasagawa et al. | |
| 2012/0242786 A1 | 9/2012 | Sasagawa et al. | |
| 2012/0242788 A1 | 9/2012 | Chuang et al. | |

FOREIGN PATENT DOCUMENTS

| | | | | |
|---|---|---|---|---|
| EP | 2306230 A1 * | 4/2011 | | G02B 3/00 |
| JP | 2002-229138 A | 8/2002 | | |
| JP | 2002-341409 A | 11/2002 | | |
| JP | 2003-348394 A | 12/2003 | | |
| JP | 2004-61808 A | 2/2004 | | |
| JP | 2004-104632 A | 4/2004 | | |
| JP | 2004-328296 A | 11/2004 | | |
| JP | 2007-171048 A | 7/2007 | | |
| JP | 2011-41196 A | 2/2011 | | |
| WO | 2005/048586 A1 | 5/2005 | | |

OTHER PUBLICATIONS

Rao et al, Combined Convection and Radiation Heat Transfer from a Fin Array with a Vertical Base and Horizontal Fins, Oct. 2007.*
Rives et al, Single View Point Omnidirectional Camera Calibration from Planar Grids, Apr. 2007.*
Canadian communication dated Apr. 3, 2014 in co-pending Canadian patent application No. 2,772,210.
Office Action mailed May 5, 2014 in co-pending U.S. Appl. No. 13/426,666.
German communication dated Sep. 18, 2013 in co-pending German patent application No. DE 10 2012 005 726.1.
German communication dated Sep. 18, 2013 in corresponding German patent application No. DE 10 2012 005 728.8.
German communication dated Sep. 18, 2013 in co-pending German patent application No. DE 10 2012 005 729.6.
Notice of Allowance mailed Sep. 10, 2014 in co-pending U.S. Appl. No. 13/426,666.
Office Action mailed Sep. 15, 2014 in co-pending U.S. Appl. No. 13/426,659.
Chinese communication, with English translation, mailed May 12, 2014 in co-pending Chinese patent application No. 201210079430.8.

* cited by examiner

OMNIDIRECTIONAL CAMERA

BACKGROUND OF THE INVENTION

The present invention relates to an omnidirectional camera which is provided with a plurality of cameras and which takes an image of an omnidirectional view.

In recent years, with spread of a navigation system, not only a positional information as an information of an electronic map but also an image information of a target, buildings, a landscape around a road, and others is required. Therefore, the measurement for acquiring the positional data as the map information is carried out and, at the same time, the image data is acquired by an omnidirectional camera.

In recent years, increase of pixel and increase in a photographing speed of an image pickup element are attempted with increase in a resolution of an omnidirectional camera. On the other hand, the realization of high pixel involves the generation of high heat of the image pickup element, and the increase in the photographing speed involves the generation of high heat of an electronic component and an electronic circuit which process an image signal output from the image pickup element. In particular, since the omnidirectional camera integrally accommodates a plurality of cameras therein, effectively releasing the heat is an important problem.

Further, the omnidirectional camera is generally used in the field, a heat release state is largely affected by a use environment. In particular, the use at a high temperature and further under the direct sunlight is a harsh environment for the omnidirectional camera, and the omnidirectional camera may not normally operate due to a high temperature in some cases.

SUMMARY OF THE INVENTION

It is an object of the present invention to provide an omnidirectional camera which can be used in high temperature and under the direct sunlight.

To attain the above object, an omnidirectional camera according to the present invention comprises two or more camera units, a camera assembly in which the two or more camera units are mounted, a heat shield cover to accommodate the camera assembly, a heat insulating member interposed between the camera assembly and the heat shield cover, a space formed between the camera assembly and the heat shield cover, a required number of slit formed in the heat shield cover and extending in up-and-down direction, and in the omnidirectional camera, the space communicates with an outside through the slit.

Further, in the omnidirectional camera according to the present invention, the camera assembly is a heat radiator and a heat of a heat generating member of the camera units is transferred to the camera assembly.

Further, in the omnidirectional camera according to the present invention, radiation fins are formed on a surface of the camera assembly.

Further, in the omnidirectional camera according to the present invention, the camera assembly has a liquid-tight structure.

Further, in the omnidirectional camera according to the present invention, a gap is formed between the heat insulating member and the heat shield cover, the space partitioned by the heat insulating member is communicated through the gap.

According to the present invention, the omnidirectional camera comprises two or more camera units, a camera assembly in which the two or more camera units are mounted, a heat shield cover to accommodate the camera assembly, a heat insulating member interposed between the camera assembly and the heat shield cover, a space formed between the camera assembly and the heat shield cover, a required number of slit formed in the heat shield cover and extending in up-and-down direction, and in the omnidirectional camera, the space communicates with an outside through the slit. As a result, the camera assembly and the heat shield cover are thermally insulated from each other, and even if the omnidirectional camera is used in high temperature and under the direct sunlight and a temperature of the heat shield cover is high, the direct sunlight is blocked by the heat shield cover and a temperature of the camera assembly is prevented from being high. Further, even if the space inside of the heat shield cover is heated, the temperature inside the heat shield cover is prevented from being high by a heat releasing of the slit.

Further, according to the present invention, in the omnidirectional camera, the camera assembly is a heat radiator and a heat of a heat generating member of the camera units is transferred to the camera assembly. As a result, a heat inside of the camera assembly is released from a surface of the camera assembly.

Further, according to the present invention, in the omnidirectional camera, radiation fins are formed on a surface of the camera assembly. As a result, a heat is effectively released from the surface of the camera assembly.

Further, according to the present invention, in the omnidirectional camera, the camera assembly has a liquid-tight structure. As a result, even if it is designed so that the slit is formed on the heat shield cover and the heat shield cover communicate with inside and outside, outdoor use is possible in bad weather, such as rainy weather or the like.

Further, according to the present invention, in the omnidirectional camera, a gap is formed between the heat insulating member and the heat shield cover, the space partitioned by the heat insulating member is communicated through the gap. As a result, a heat is effectively released without blocking a convection of air inside of the camera assembly.

DETAILED DESCRIPTION OF THE PREFERRED EMBODIMENTS

Description will be given on embodiments of the present invention by referring to the attached drawings.

Figure 1:
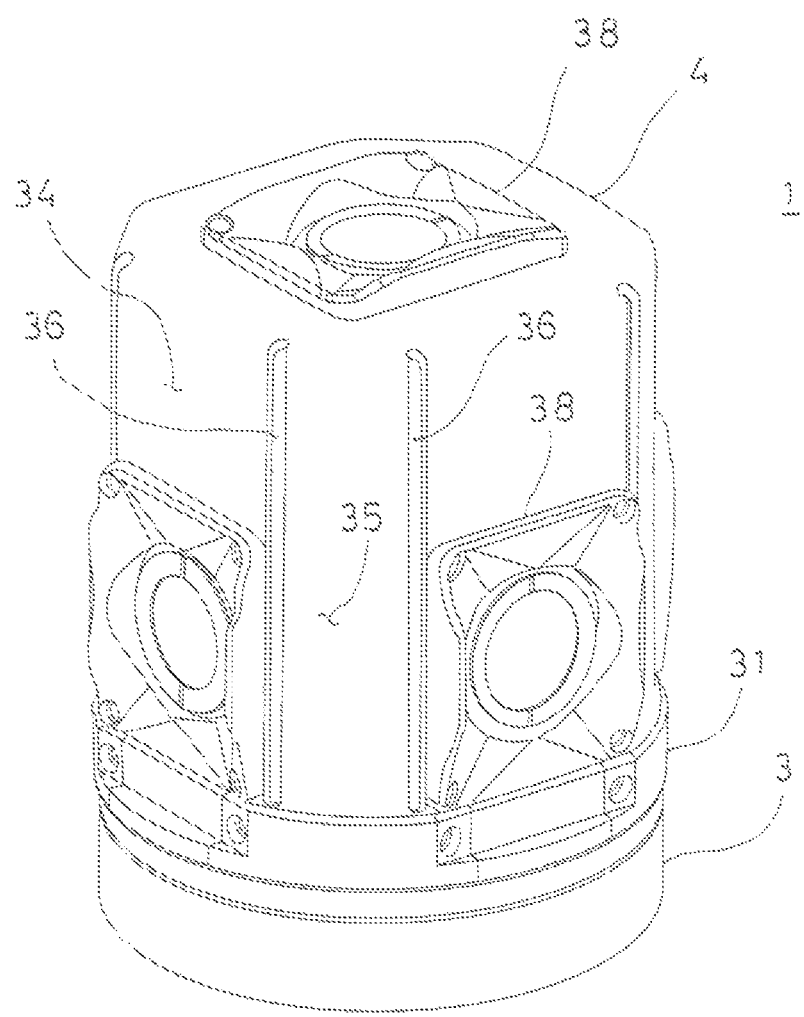
FIG. 1 is a perspective view of an omnidirectional camera according to an embodiment of the present invention.
Figure 2:
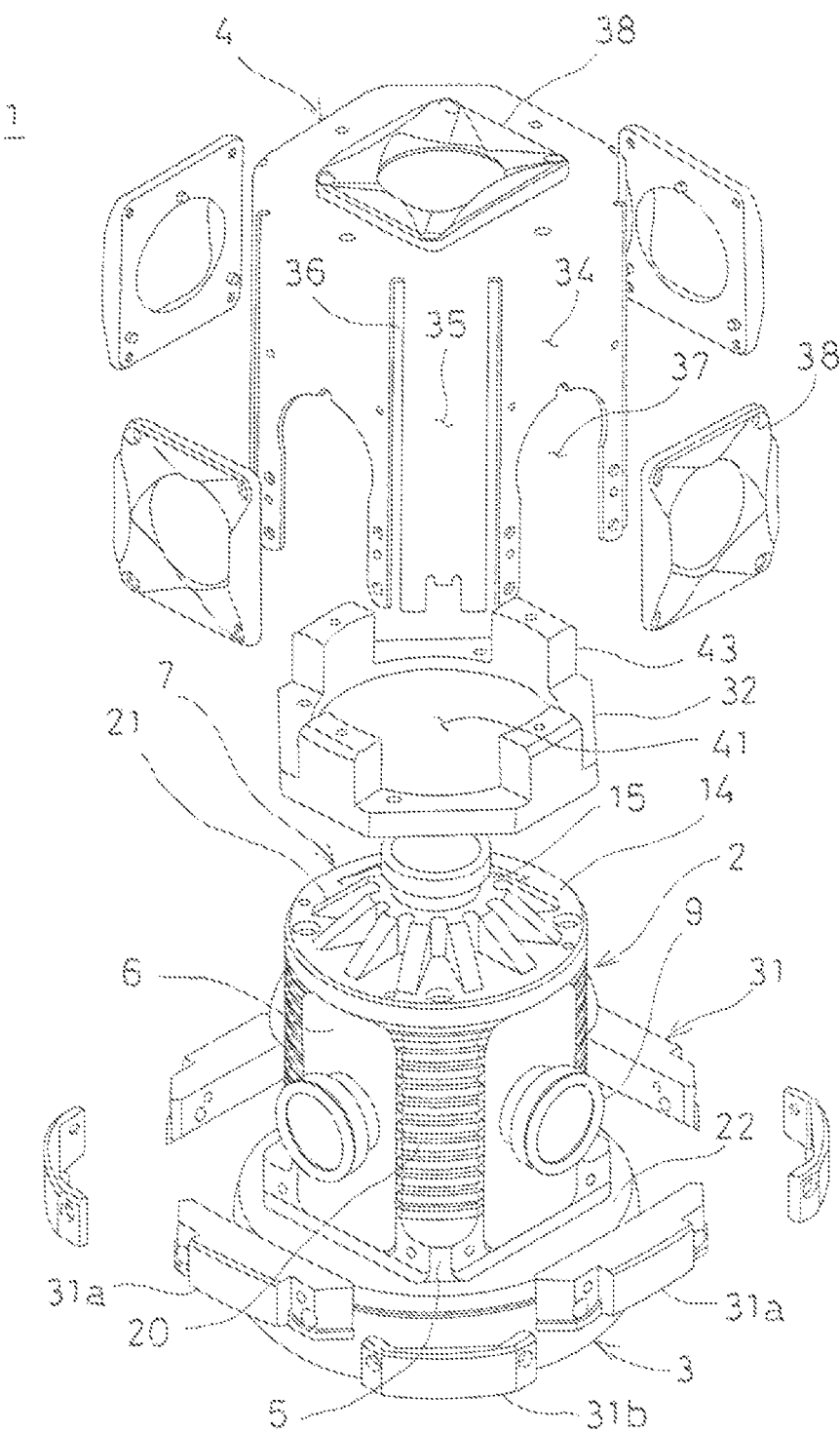
FIG. 2 is an exploded perspective view of the omnidirectional camera.

FIG. 1 and FIG. 2 show appearance of an omnidirectional camera 1 according to an embodiment of the present invention.

The omnidirectional camera 1 mainly includes a camera assembly 2, an image processing unit 3 accommodating an image processing integrated circuit, an electronic circuit, and others, and a heat shield cover 4 with good ventilation.

The camera assembly 2 has a camera mounting frame 5 made of a metal material with good heat transfer properties such as aluminum or copper or the like, the camera mounting frame 5 is a cylindrical hollow body having a circular cross section, and four horizontal camera units 6 and a vertical camera unit 7 are provided in the camera mounting frame 5. A total of four horizontal camera units 6 are present on a horizontal plane orthogonal to a center line of the camera mounting frame 5, and each two-unit is arranged respectively on two center lines perpendicular to each other. An optical axis of the horizontal camera units 6 is parallel to or coincides with the center lines. Further, the vertical camera unit 7 is arranged at an upper end of the camera mounting frame 5 so as to coincide with the center line of the camera mounting frame 5. An optical axis of the vertical camera unit 7 coincides with the center line of the camera mounting frame 5 and is vertical. It is to be noted that the camera mounting frame 5 may be a cylindrical hollow body having a polygonal cross section.

Figure 3:
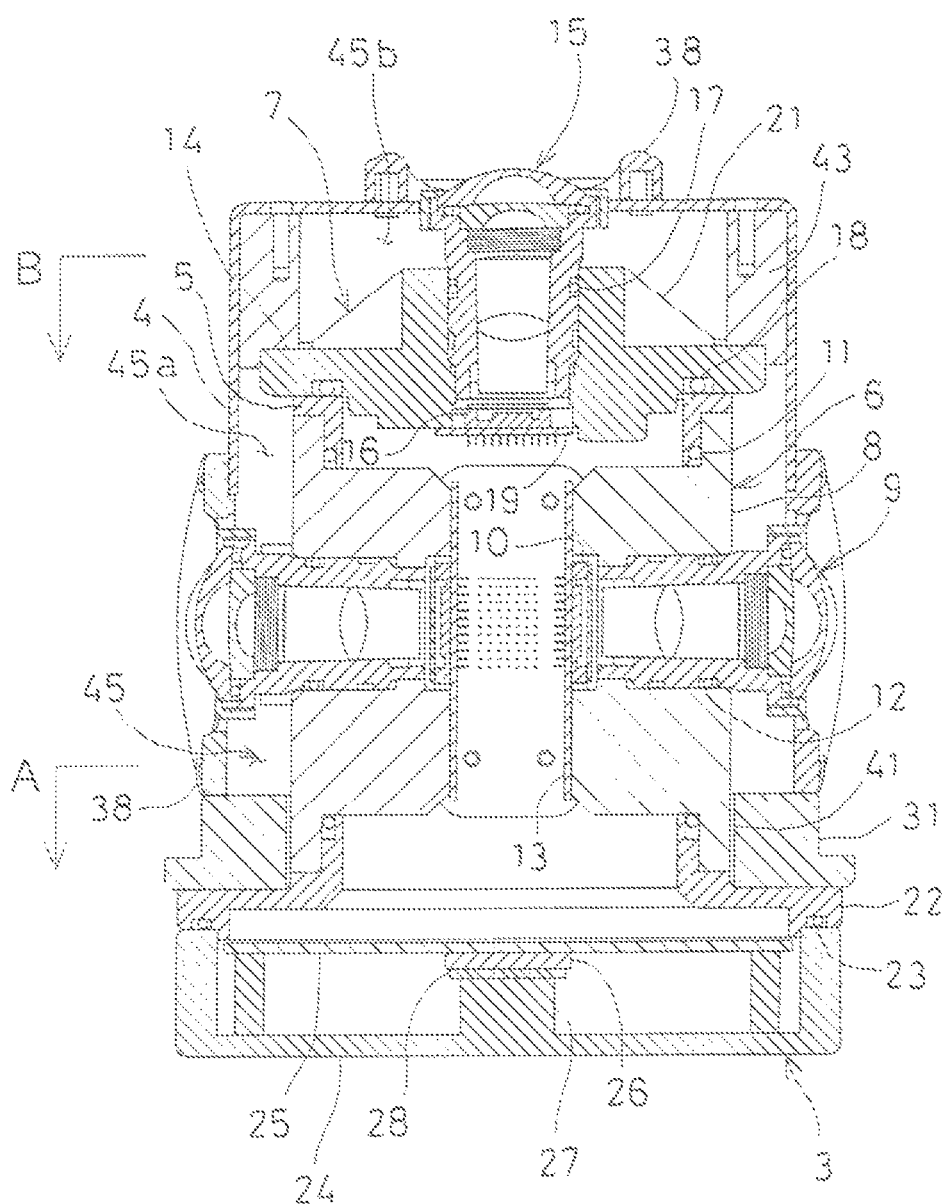
FIG. 3 is a sectional elevational view of the omnidirectional camera.

The horizontal camera unit 6 comprises a first mount block 8, a first lens unit 9 inserted into the first mount block 8 from the outside in the radial direction, and a first image pickup element 10 (see FIG. 3) arranged at a focal position of the first lens unit 9, and the first mount block 8 is made of a metal material with good heat transfer properties, such as aluminum or copper or the like.

Heat radiation fins 20 are formed in a horizontal direction at portions of the camera mounting frame 5 where the horizontal camera units 6 are not installed, and the heat radiation fins 20 are provided at a predetermined pitch in a vertical direction.

The first mount block 8 is installed on the camera mounting frame 5 from the outside. A seal ring 11 is interposed between the camera mounting frame 5 and the first mount block 8, and the first mount block 8 and the camera mounting frame 5 are liquid-tightly sealed.

A seal ring 12 is interposed between the first lens unit 9 and the first mount block 8, and the first lens unit 9 is liquid-tightly supported. Furthermore, the first lens unit 9 itself has a liquid-tight structure.

A first circuit board 13 is disposed to an inner surface of the first mount block 8, and the first image pickup element 10 is mounted on the first circuit board 13. Moreover, a ground layer is formed on a front-side surface (that is a surface which is in contact with the first mount block 8) of the first circuit board 13, and the first circuit board 13 is in contact with the first mount block 8 through the ground layer.

The vertical camera unit 7 comprises a second mount block 14, a second lens unit 15 inserted into the second mount block 14 from above, and a second image pickup element 16 (see FIG. 3) arranged at a focal position of the second lens unit 15, and the second mount block 14 is made of a metal material with good heat transfer properties, e.g., the aluminum or the copper or the like. Additionally, the second mount block 14 has a nearly truncated cone shape. Triangular heat radiation fins 21 are formed on an upper surface of the second mount block 14 at a predetermined angular pitch with the second lens unit 15 as the center and the heat radiation fins 21 extend radiantly from the second lens unit 15.

A seal ring 17 is provided between the second mount block 14 and the second lens unit 15, and the second lens unit 15 and the second mount block 14 are liquid-tightly sealed. It is to be noted that the second lens unit 15 itself has a liquid-tight structure.

The second mount block 14 is disposed in an upper end of the camera mounting frame 5 in such a manner that the second mount block 14 covers an opening of the upper end. A seal ring 18 is provided between the upper end of the camera mounting frame 5 and the second mount block 14, and the camera mounting frame 5 and the second mount block 14 are liquid-tightly sealed.

A second circuit board 19 is disposed to a lower surface of the second mount block 14, and the second image pickup element 16 is mounted on the second circuit board 19. Further, a ground layer is formed on an upper surface (that is a surface which is in contact with the second mount block 14) of the second circuit board 19, and the second circuit board 19 is in contact with the second mount block 14 through the ground layer.

A flange 22 is formed at a lower end of the camera mounting frame 5, the image processing unit 3 is disposed to a lower surface of the flange 22, a seal ring 23 is interposed between the image processing unit 3 and the flange 22, and the image processing unit 3 and the camera mounting frame 5 are liquid-tightly sealed.

The image processing unit 3 has a bottom case 24 and a circuit board 25 accommodated in the bottom case 24, and an image processing integrated circuit 26 is mounted on a back surface of the circuit board 25. A heat transfer portion 27 is provided to protrude at a position of the bottom case 24 where the heat transfer portion 27 faces the image processing integrated circuit 26, and the heat transfer portion 27 is in contact with the image processing integrated circuit 26 through a heat transfer member 28. As the heat transfer member 28, for example, the thermally-conductive sponge, e.g., silicon rubber or the like is used.

The camera assembly 2 constitutes a liquid-tight structure by the camera mounting frame 5, the horizontal camera units 6 mounted on the camera mounting frame 5, the vertical camera unit 7, and the image processing unit 3.

The heat shield cover 4 is provided so as to accommodate the camera assembly 2, and a lower heat insulating member 31 and an upper heat insulating member 32 are interposed between the camera assembly 2 and the heat shield cover 4. As a material for the lower heat insulating member 31 and the upper heating insulating member 32, for example, a material with the low heat transfer properties such as a polyacetal resin or the like is used.

The heat shield cover 4 is formed into an octagonal prism whose cross section is octagonal. The octagonal shape is formed by alternately arranging long sides and short sides, and the two pairs of opposite long sides and the two pairs of opposite short sides are parallel to each other, respectively.

A slit 36 is formed between each side surface including the long side (which will be referred to as a long-side surface 34 hereinafter) and each side surface including the short side (which will be referred to as a short-side surface 35 hereinafter) along a ridge line, and the long-side surface 34 and the short-side surface 35 are separated from each other by the slit 36.

The long-side surfaces 34 face the horizontal camera units 6, and a lens hole 37 is formed in the long-side surface 34 concentrically with an optical axis of the horizontal camera unit 6. A diameter of the lens hole 37 is larger than a diameter of an end portion of the first lens unit 9, and a gap is formed around the first lens unit 9.

Moreover, a lens hood 38 is mounted on long-side surface 34 concentrically with the lens hole 37. The lens hood 38 has a rectangular outer shape and a hole formed at the center of the lens hood 38. The hole has the same or nearly the same diameter as a diameter of the lens hole 37. A surface of the lens hood 38 is formed of a curved surface which does not intercept a field angle of the horizontal camera unit 6, and a maximum height (a height from the long-side surface 34) of the surface of the lens hood 38 is higher than a height of a maximum protruding portion of the first lens unit 9.

The lens hole 37 is likewise formed in a ceiling surface of the heat shield cover 4 concentrically with an optical axis of the second lens unit 15, and the lens hood 38 is mounted on the ceiling concentrically with the lens hole 37.

Since the lens hoods 38 are provided, when the omnidirectional camera 1, falls, the lens hoods 38 protect the first lens unit 9 and the second lens unit 15 and prevent a damage and a breakage of the lens.

The lower heat insulating member 31 is constituted of four member pieces 31a in protrusion shape and fixing member pieces 31b with arc shape attached so as to link with the adjacent member pieces 31a. The member pieces 31a are fixed to the lower portion of the camera mounting frame 5 by screws in a state that the member pieces 31a are put on the flange 22, and the fixing member pieces 31b are fixed to the member pieces 31a by screws so as to sandwich lower ends of the short-side surfaces 35 between the fixing member pieces 31b and the end surfaces of the member pieces 31a.

Additionally, the upper heat insulating member 32 has a ring shape with a hole 41 into which the second mount block 14 can be inserted, an outer shape of the upper heat insulating member 32 is a regular octagon, and convex portions 43 are formed on an upper surface every other side. The upper heat insulating member 32 is installed on the upper surface of the second mount block 14.

In a state that the member pieces 31a are installed on the camera mounting frame 5 and the upper heat insulating member 32 is installed on the second mount block 14, the heat shield cover 4 is put on the camera assembly 2 from above the second mount block 14 in such manner that the camera assembly 2 is accommodated in the heat shield cover 4. The heat shield cover 4 is secured to the convex portions 43 by screws piercing through the ceiling surface of the heat shield cover 4. Furthermore, the fixing member pieces 31b are fixed.

Figure 4:
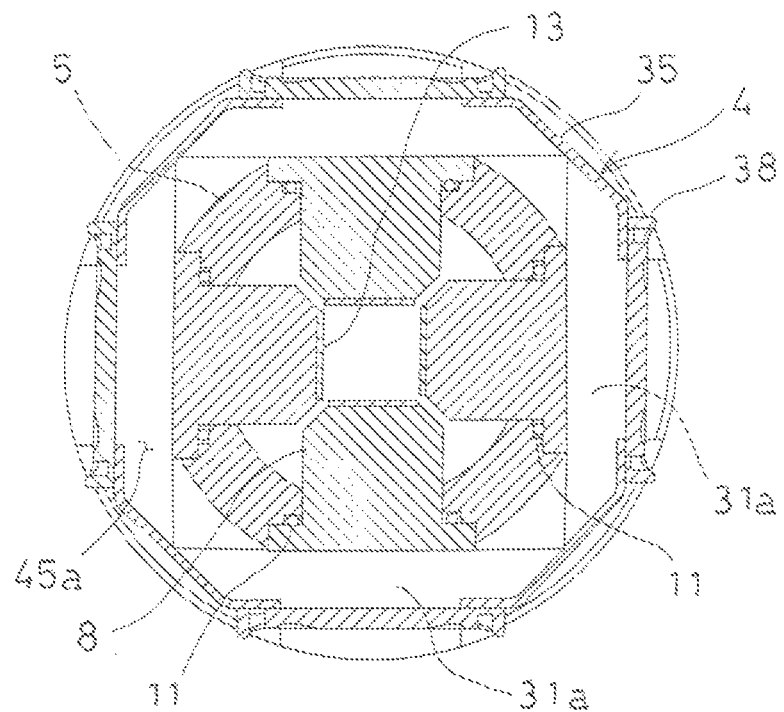
FIG. 4 is an arrow diagram A of FIG. 3.
Figure 5:
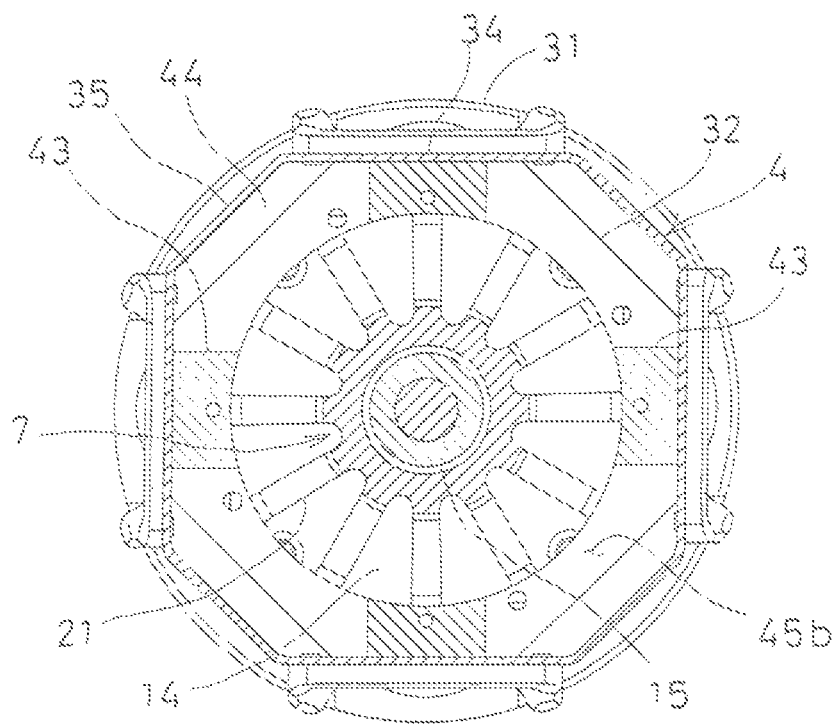
FIG. 5 is an arrow diagram B of FIG. 3.

FIG. 4 and FIG. 5 show a relationship between the lower heat insulating member 31 and the upper heat insulating member 32 in a state that the heat shield cover 4 is put on. A lower end of the heat shield cover 4 is nearly hermetically closed by the lower heat insulating member 31. The upper heating insulating member 32 is in contact with the long-side surfaces 34 every other side and is apart from the short-side surfaces 35 every other adjacent side, and a gap 44 is formed between each short-side surface 35 and the upper heat insulating member 32.

Therefore, the camera mounting frame 5 is held at the center of the heat shield cover 4 by the lower heat insulating member 31 and the upper heat insulating member 32, and a space 45 for heat radiation is formed around the camera mounting frame 5. Additionally, a space 45a formed between the lower heat insulating member 31 and the upper heat insulating member 32 communicates with a space 45b formed above the upper heating insulating member 32 through the gap 44. Further, since the lower heat insulating member 31 and the upper heat insulating member 32 are interposed between the camera assembly 2 and the heat shield cover 4, the camera assembly 2 and the heat shield cover 4 are thermally insulated from each other.

Next, a cooling function of the omnidirectional camera 1 will now be described.

Typical heat generating members in the omnidirectional camera 1 are the first image pickup element 10, the second image pickup element 16 and the image processing integrated circuit 26. Heat generated from the first image pickup element 10 is transferred from the ground layer of the first circuit board 13 to the first mount block 8 and further transmitted to the camera mounting frame 5. The first mount block 8 and the camera mounting frame 5 serve as heat radiators, and the heat is radiated into the space 45a from the surface of the first mount block 8 and the surface of the camera mounting frame 5. Furthermore, since the heat radiation fins 20 are formed on the surface of the camera mounting frame 5, the heat is effectively radiated.

Additionally, the heat generated from the second image pickup element 16 is transferred from the ground layer of the second circuit board 19 to the second mount block 14. The heat transferred to the second mount block 14 is radiated effectively into the space 45b from the heat radiation fins 21.

The camera assembly 2 has the liquid-tight structure. The heat generated from the first image pickup element 10 and the second image pickup element 16, which are accommodated inside of the camera assembly 2 and are heating elements, is efficiently transferred to the camera mounting frame 5, the first mount block 8, and the second mount block 14. Therefore, the camera assembly 2 can be regarded as a heating element as a whole.

The space 45a communicates with the outside of the heat shield cover 4 through the slits 36 and the lens holes 37. Furthermore, the space 45b communicates with the outside through the upper portions of the slits 36 and the periphery of the second lens unit 15. Moreover, the space 45a and the space 45b communicate with each other in up-and-down direction through the gap 44.

Therefore, the airs in the space 45a and the space 45b adjacent to the camera assembly 2 are warmed by the camera assembly 2, the warmed airs flow up without blocking the convection, and an outside air is sucked through the slits 36 and the gap around the first lens unit 9, and the heat from the camera mounting frame 5 and the second mount block 14 is effectively discharged to the outside.

As described above, since the camera assembly 2 has the liquid-tight structure, outdoor use is possible under the bad weather, e.g., the rainy weather and others even though the slits 36 are formed in the heat shield cover 4 and the inside and the outside of the heat shield cover 9 can communicate with each other.

Next, the generation of heat by the image processing integrated circuit 26 will now be described.

The heat generated by the image processing integrated circuit 26 is transferred to the bottom case 24 through the heat transfer member 28 and the heat transfer portion 27, and the heat is radiated from the surface of the bottom case 24.

Although the description has been given as to the cooling function of the omnidirectional camera 1 in case where the omnidirectional camera 1 is in a standstill state, the omnidirectional camera 1 is mounted in a mobile object in order to acquire images. For example, the omnidirectional camera 1 is installed on a ceiling of an automobile and acquires an omnidirectional image while moving.

The cooling function during moving of the omnidirectional camera 1 will now be described with reference to FIG. 6.

Figure 6:
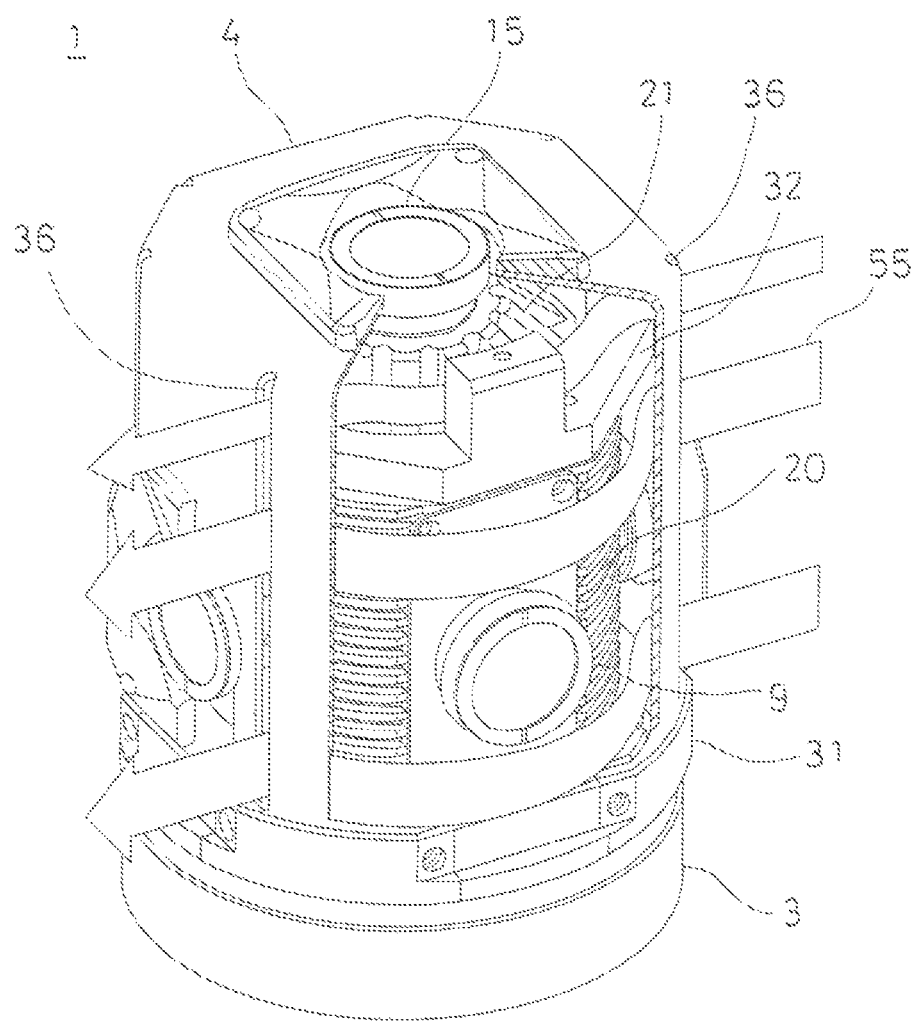
FIG. 6 is an explanatory view showing a cooling function during moving or in a state that the wind blows and FIG. 6 is also a partially cutaway perspective view of a heat shield cover.

FIG. 6 shows a state that the omnidirectional camera 1 is moving to the right side in the drawing. When the omnidirectional camera 1 moves, a wind 55 flows into an inside of the heat shield cover 4 from the slits 36 on the windward and flows out through the slits 36 on the leeward. Therefore, the cooling effect is remarkably improved.

It is to be noted that the cooling effect can be obtained similarly in a state that the wind is blowing, if the omnidirectional camera 1 is at a standstill.

The description will now be given as to a case that the omnidirectional camera 1 is used under high temperature and under the direct sunlight.

When the omnidirectional camera 1 is irradiated with the direct sunlight, the temperature of an irradiated portion becomes considerably high due to the solar heat.

In case of the omnidirectional camera 1, the heat shield cover 4 is irradiated with the direct sunlight and the temperature of the heat shield cover 4 becomes high. On the other hand, the camera assembly 2 is accommodated in the heat shield cover 4, and the head shield cover 4 blocks the direct sunlight. Further, the camera assembly 2 is thermally insulated from the heat shield cover 4 by the lower heat insulating member 31 and the upper heat insulating member 32. Therefore, there is no case where the camera assembly 2 is heated by a heat conduction from the heat shield cover 4.

Further, since the space 45 is formed around the camera assembly 2 and the space 45 communicates with the outside through the slits 36 and the lens holes 37, the heated air is released to the outside by the convection and the heated air is not stagnated inside even if the temperature of the heat shield cover 4 becomes high and the air in the space 45 is heated by the heat shield cover 4.

Therefore, even if the omnidirectional camera 1 is used at a high temperature under the direct sunlight, the omnidirectional camera 1 normally operates.

As for a shape of the heat shield cover 4, a cross section may be circular or rectangular, and any shape can suffice if the heat shield cover 4 can accommodate the camera assembly 2. Furthermore, as for a shape of the upper heat insulating member 32, any shape can suffice if spaces above and below the upper heat insulating member 32 communicate with each other. Therefore, a concave portion may be formed around the upper heat insulating member 32, or a hole penetrating in up-and-down direction may be formed in the upper heat insulating member 32. Moreover, although the four horizontal camera units 6 are provided in the foregoing embodiment, three, five or more horizontal camera units 6 may be provided. Additionally, when an image of the upper side does not have to be acquired, the vertical camera unit 7 can be omitted.

The invention claimed is:

1. An omnidirectional camera, comprising two or more camera units, a camera assembly in which said two or more camera units are mounted, a heat shield cover to accommodate said camera assembly, a lower heat insulating member and an upper heat insulating member interposed between said camera assembly and said heat shield cover, a space formed between said camera assembly and said heat shield cover, a required number of slits formed in said heat shield cover and extending in up-and-down direction, wherein air passes between outside said heat shield cover and said space through said slits, wherein said heat shield cover is formed into an octagonal prism whose cross section is octagonal, wherein said camera assembly is used to dissipate heat and heat from a heat generating member of said camera units is transferred to said camera assembly and wherein radiation fins are formed on a surface of said camera assembly.

2. An omnidirectional camera according to claim 1, wherein said camera assembly comprises a mount block to which said camera units are attached, wherein seal rings are interposed between said camera units and said mount block such that said camera assembly has a liquid-tight structure.

3. An omnidirectional camera according to claim 1 or claim 2, wherein said upper heat insulating member divides said space into two portions, a gap is formed between said upper heat insulating member and said heat shield cover, and air passes between said two portions through said gap.

* * * * *